R. F. WEBBER & G. W. SLATER.
STARTING DEVICE FOR MOTOR VEHICLES.
APPLICATION FILED MAR. 19, 1910.
1,160,474.
Patented Nov. 16, 1915.
3 SHEETS—SHEET 1.
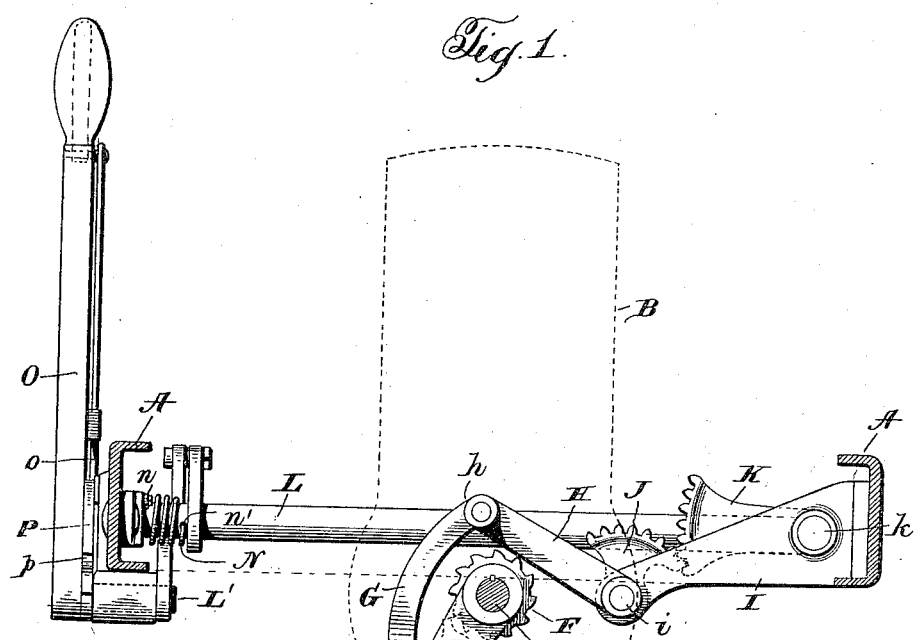
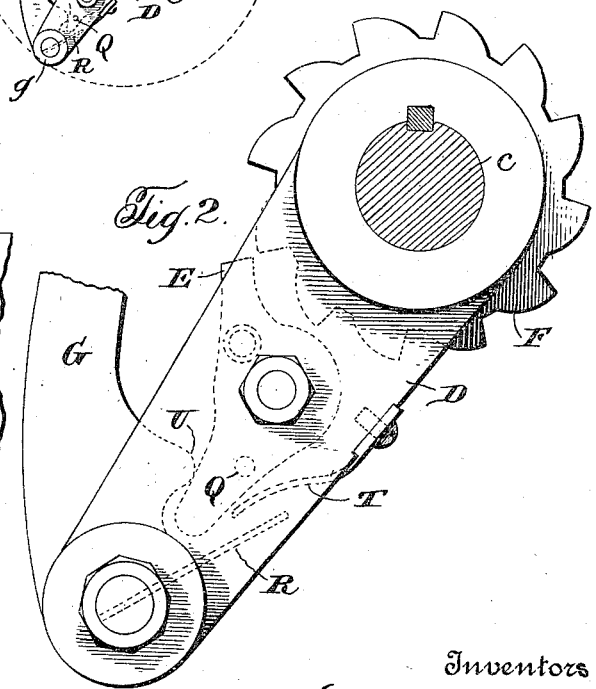
Witnesses:
Jas. E. Hutchinson
Carrie A. Key
Inventors
Rollin F. Webber and George W. Slater,
By their Attorneys.

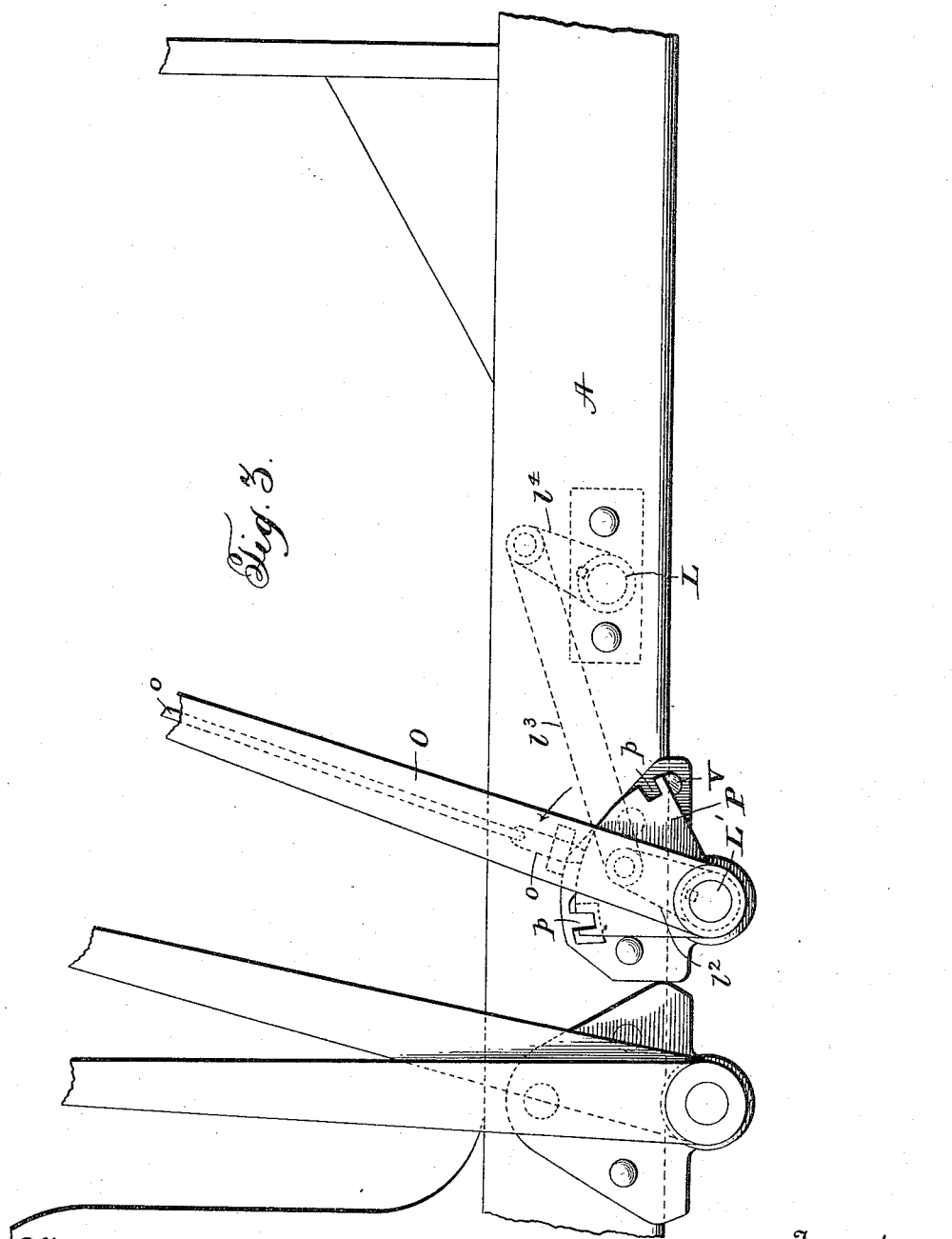

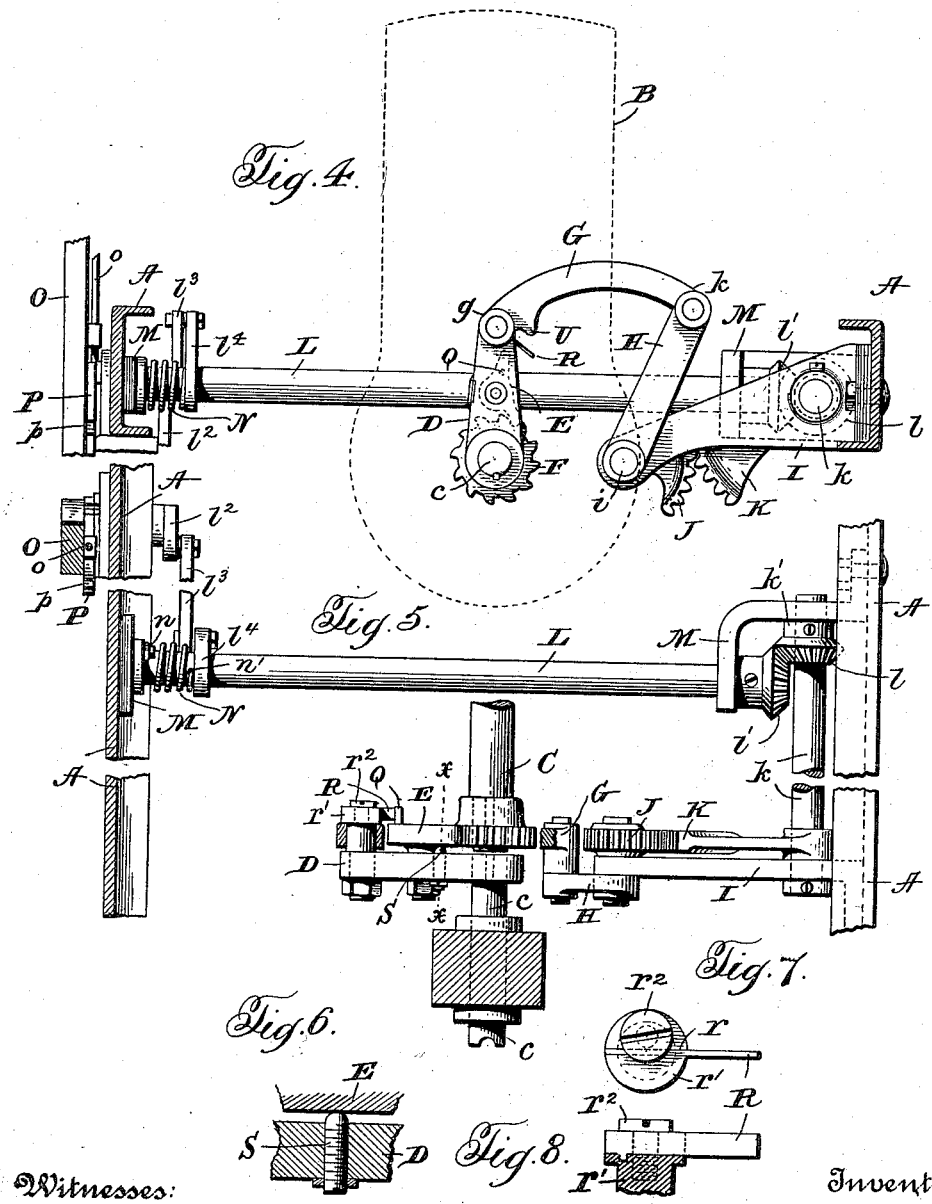

UNITED STATES PATENT OFFICE.

ROLLIN F. WEBBER AND GEORGE W. SLATER, OF WASHINGTON, DISTRICT OF COLUMBIA, ASSIGNORS TO AUTOMATIC APPLIANCES AND MANUFACTURING CORPORATION, OF WILMINGTON, DELAWARE, A CORPORATION OF DELAWARE.

STARTING DEVICE FOR MOTOR-VEHICLES.

1,160,474. Specification of Letters Patent. Patented Nov. 16, 1915.

Application filed March 19, 1910. Serial No. 550,518.

*To all whom it may concern:*

Be it known that we, ROLLIN F. WEBBER and GEORGE W. SLATER, citizens of the United States, residing at Washington, in the District of Columbia, have invented certain new and useful Improvements in Starting Devices for Motor-Vehicles, of which the following is a specification, reference being had therein to the accompanying drawing.

This invention relates to improvements in devices adapted to facilitate the starting of motors, and particularly gas engines of the compression type, and has for its primary object the provision of such a device especially designed for use in connection with motor vehicles and adapted to be operated by the occupant of the vehicle, conveniently from the seat of the latter.

The invention comprehends manually operable means for imparting to the engine its initial forward impulse in combination with parts for breaking the operative connection of said means with the engine during the normal actuation of the starter, and preferably other means for positively breaking said operative connection and retaining the coöperating elements in disconnected relation upon a reversing or backward movement of the engine.

The invention also embraces starting mechanism including an operating lever adapted to be drawn toward the operator in the starting movement thereof, but to be thrown away from the operator as an incident to backward or reverse movement of the engine to prevent injury to the operator.

The invention further embraces the provision of means for automatically restoring the starting mechanism to its initial position after the completion of the starting operation, and preferably means enabling a varied positioning of the operating lever to suit the whim or desire of the occupant of the vehicle, while always maintaining the parts in operative relation.

The invention still further includes a starting mechanism, connecting instrumentalities formed and arranged to increase the leverage or power of the device through its starting operation, so that as the compression in the cylinder increases, the leverage and power of the starting device is also being increased to correspond therewith.

Another feature of the invention resides in that characteristic thereof which enables the starting device to constitute an attachment applicable practically to any and all motor vehicles, either by engagement with the engine shaft or with the fly wheel thereof, and preferably we also provide a shaft extension for the accommodation of a starting crank as now commonly employed.

All of the foregoing, as well as many other features incident to the details and arrangements of parts of a practical embodiment of the invention will be apparent from the specific description hereinafter contained when read in connection with the accompanying drawings forming part hereof, wherein a convenient embodiment of the invention is illustrated.

In the drawings, Figure 1 is a front elevation of the starting mechanism, the engine being shown in dotted lines and the engine shaft and side frame portions of the vehicle in section, Fig. 2 is an enlarged view of a fragmentary portion of the starting mechanism illustrating the manner of disengaging the same from the engine shaft, Fig. 3 is a fragmentary elevation of the lower portions of the operating lever and immediately associated parts, Fig. 4 is an elevation similar to Fig. 1 showing the position of the parts near the completion of their starting movement, the position illustrated in Fig. 1 being that assumed by the same parts at the commencement of said starting movement, Fig. 5 is a plan view of Fig. 1, with parts broken away and others shown in section, Fig. 6 is an enlarged sectional view on the line $x$—$x$ of Fig. 5, Fig. 7 is a detail elevation, Fig. 8 is a sectional view showing the details of the spring trip for throwing the dog into and out of engagement with its ratchet to operatively engage and disengage the starting mechanism relative to the engine shaft, and Fig. 9 is a view similar to Fig. 3 showing a modified construction.

Referring more specifically to the drawings, wherein like reference characters designate corresponding parts in the several views, A represents the side members of a vehicle frame, B the engine for propelling the vehicle, and C the end of the engine crank shaft which in turn reciprocates the piston, all as well known in the art and not necessary to illustrate in detail herein. It may be observed, however, that a separate extension $c$ of the shaft C is provided, the same being notched, squared or otherwise formed for the reception of the ordinary hand crank, should occasion arise, for the use of the latter. Keyed to the extension $c$ is an arm D which carries a pivoted dog E adapted, as will hereinafter more fully appear to engage the teeth of a ratchet F, on the shaft C.

An elongated curved link G is pivoted at one end $g$ to the outer end of the arm D, and at its other end $h$ to connecting means, constituting in effect a bell crank lever H pivoted at $i$ to a bracket I rigid with the frame A. The opposite end of the bell crank lever H, the same being the shorter arm of said lever, is formed into a segment or sector J which is adapted to be actuated by suitable gearing. In the embodiment of the invention disclosed in the drawings, the segment J is toothed and is arranged to constantly mesh with a complementary segment K keyed to or formed integral with the shaft $k$ rotatably mounted in bearings $k'$ rigid with a frame A.

The shaft $k$ above referred to carries a beveled gear $l$ fixed to rotate therewith, the gear in turn meshing with a similar gear $l'$ at right angles thereto, carried by and fixed to rotate with the main operating shaft L arranged transversely of the vehicle and rotatably mounted in bearings M on the frame.

A stub shaft L' rotatably mounted in the frame, connects through the medium of an arm $l^2$, link $l^3$ and arm $l^4$ with the shaft L. In some instances, however, where the parts are arranged on closer association, these arms and link are dispensed with as illustrated in Fig. 9, for example.

A coil spring N coiled about the shaft L secured at $n$ to the frame and at its opposite end $n'$ to the shaft operated to restore and maintain the shaft and connected parts in a normally inactive position, it being observed that when the shaft is turned in its starting operation, the spring will be coiled or wound tightly to store power in the same, so that when the shaft is released, the unwinding of the spring will throw the parts back to their initial position.

O is the operating lever adapted to be manually operated by the occupant of the vehicle and to that end said lever is disposed near the right hand end of the vehicle seat and in front of the same. It will be understood, however, that as found desirable or conditions may require, the positioning of this operating lever may be readily changed. The lever is sleeved upon the end of the shaft L', which protrudes from the adjacent side bar A of the frame, the connection between the lever and the shaft being accomplished through the medium of a sector P fixed to the shaft and a latch $o$ on a lever adapted to engage one of a series of notched portions $p$ in the curved peripheral portion of the segment. This arrangement enables the lever to occupy a substantially vertical position, if desired, in engagement with the upper slotted portion in proximity to the usual other controlling levers of the machine, and when desired to manipulate the starter, the lever will be thrown down to engage the lower slotted portion and drawn upwardly in the direction of the arrow, Fig. 3, toward the seat. It should be here noticed that the operating movement of the hand lever being toward the body, which, of course, is that movement which imparts the initial forward impulse to the engine. Should the engine reverse the lever will be thrown away from the body, preventing injury to the occupant, and also owing to features of the construction now to be pointed out, preventing injury to the mechanism.

In Fig. 1, wherein the parts are illustrated in their inactive position, it will be seen that the dog E is disengaged from the ratchet F. To throw the same into active position, the tail of the dog is provided with a laterally projecting pin Q arranged in the path of movement of a spring R fixed to move with the link G and occupying a permanent relation to said link. The spring is secured in place by inserting the same within a slotted portion $r$ of the bolt head $r'$, a headed screw $r^2$ overlying the edge of the spring and bearing thereon. The movement of the link G and arm D in an upward direction causes the spring R to engage the pin Q on the dog and rock the same into engagement with the ratchet F, an adjustable friction plug S passing through the arm D and abutting against the dog preventing the same rattling or swinging, save as it is forcibly moved under the coöperation of other parts during the actuation of the device. In the continued forward movement of the device, the spring R rides over the pin Q, as illustrated in Fig. 4. On the return or reverse movement of the parts, the dog rides out of engagement with the teeth of the ratchet, and the spring passes over the pin into its initial position behind the dog, a back spring T on the arm D preventing excessive movement of the dog. This last mentioned spring is arranged laterally beyond the path of movement of the spring R whereby not to obstruct the same. It will also be understood that as the engine starts and runs ahead of the actuating means, the dog is by that movement shifted out of engagement with and beyond the path of the teeth of the ratchet.

Auxiliary means are provided for positively engaging the tail of the dog E in the reverse movement of the starter and for holding the dog out of engagement with its ratchet, the same comprising a cam or enlargement U projecting from the under surface of the curved link G, said cam in the forward or starting operation of the device receding from the dog, as clearly illustrated in Fig. 4, but approaching and abutting the same in the reverse or return movement, as appears in Figs. 1 and 2.

The operation of the device may now be followed: Assuming that for the sake of convenience, the operating lever O is in approximately vertical position, as indicated by dotted lines in Fig. 3, and the other parts in inactive position, as illustrated in Fig. 1, the occupants of the vehicle upon desiring to start the motor will simply disengage the lever from the upper notched portion of the segment and swing it forwardly into engagement with the lower notched portion. Then an elevating and backward pull on the lever rotates the plate P and therethrough the shaft L in the direction of the arrows Fig. 3, which in turn winds up the restoring spring N and turns the gear *l'* on the end of the shaft. This gear transmitting its motion to the shaft *k* through the gear *l* swings the toothed segment K downwardly, Fig. 1, correspondingly moving the bell crank lever H to carry the link G and arm D upwardly to the position of Fig. 4, this movement causing the trip spring R operating against and riding over the pin Q of the dog E to throw the dog into engagement with the ratchet F at the commencement of said movement. This operation, as will be obvious, turns the crank shaft of the engine and compresses the charge in the cylinder, an important feature of the operation being that as the compression becomes greater, so the leverage and power of the compressing action of the device increased, by reason of our special arrangement of links and levers. It is noted that at the end of the starting or compressing movement of the device, the long arm of the lever H and the arm D, are arranged in an upwardly diverging relation, thus enabling the utilization of a long link G. Upon the operator releasing his hold upon the handle O, or upon disengaging the latch *o* of the lever from the coupling plate P, the shaft L is rotated in a reverse direction under the unwinding action of the spring O, and the other parts of the device correspondingly restored to the initial position, as shown in Fig. 1, a stop V on the frame A being arranged to be engaged by the plate P at the end of said return movement. In this return or reverse movement, the spring R engages the opposite side of the pin Q of the dog and throws the same out from engagement with the ratchet F, the dog being frictionally retarded by the plug S and held against excessive movement by the back spring T, and the actuation of the dog in this manner is all that would ordinarily be desired. However, to constitute an additional safe-guard and to provide a positive dog actuating means, as distinguished from the relatively impositive character of a spring, the cam U on the link G is employed to engage and hold the dog out of engagement with the ratchet F. This positively insures an instant disengagement at all times of the starting mechanism from the ratchet wheel on the engine shaft, save in the forward starting impulse of the engine, and thus any reversing or backward tendency or movement of the engine itself automatically releases the parts, so that the operating lever while it may be thrown forwardly out of the hand of the operator cannot be influenced by said reversing or backward action of the engine, either to injure the person or impair the operating parts.

While we have herein disclosed one embodiment of the invention, it is to be understood that the invention is capable of being embodied in other forms and devices, as will appear to those skilled in the art.

We claim:

1. The combination with a motor, of a starting device therefor comprising means including a releasable device for imparting a forward impulse to the motor, an operating lever, and means independent of said first mentioned releasing means for adjusting the lever to various positions relative to the parts to be operated thereby.

2. The combination with a motor, of a starting device therefor comprising means including a releasable device for imparting a forward impulse to the motor, a hand lever arranged to turn toward the operator in its acting movement but to recede from the operator in the reverse movement, and means independent of said first mentioned releasing means for adjusting the lever to various positions relative to the parts to be operated thereby.

3. The combination with a motor, of a starting device therefor comprising means including a releasable device for imparting a forward impulse to the motor, an operating lever, means independent of said first mentioned releasing means for adjusting the lever to various positions relative to the parts to be operated thereby, and means for restoring the impulse creating means to normal position after actuation by the lever when the lever is free.

4. A starting device of the character described comprising a lever, operating parts associated therewith, a coupling member between said lever and operating parts permitting the lever to occupy various positions while preserving the same operating connection, said means including a notched plate rigid with the operating parts, and means on the lever adapted to engage any of said notched portions to give the desired normal position of the lever.

5. A starting device for motors comprising an arm operatively associated with the motor shaft, an operating lever pivoted at one side of said shaft and in substantially the horizontal plane of the shaft, a pivoted link connection between said lever and arm, and means for actuating said operating lever.

6. A starting device for motors comprising an arm operatively associated with the motor shaft, an operating lever pivoted at one side of the motor shaft, and a pivoted elongated curved link connection between said lever and arm, said arm and lever occupying a diverging relation to each other to accommodate said link.

7. A starting device for motors comprising an arm operatively associated with the motor shaft, an operating lever, a pivoted link connection between said lever and arm, a pawl and ratchet connection between the arm and motor shaft, and means for positively engaging the pawl to throw the same into and out of engagement with the ratchet when the operating lever is shifted.

8. A starting device for motors comprising an arm operatively associated with the motor shaft, an operating lever, a pivoted link connection between said lever and arm, a pawl and ratchet connection between the arm and motor shaft, and means for throwing the pawl into and out of engagement with the ratchet, and other means positively holding the pawl in its disengaged position upon a reverse movement of the shaft.

9. The combination with a motor, of means for starting the same comprising an arm operatively associated with the motor shaft, a bell crank lever, one arm of which constitutes a toothed segment, a link connection between the other arm of said lever and said first mentioned arm, a complementary segment engaging the lever, and means for operating the segment in the forward direction.

10. The combination with a motor, of means for starting the same comprising an arm operatively associated with the motor shaft, a bell crank lever, one arm of which constitutes a toothed segment, a link connection between the other arm of said lever and said first mentioned arm, a complementary segment engaging the lever, and means for operating the segment in both a forward and reverse direction.

11. The combination with a motor, of means for starting the same comprising an arm operatively associated with the motor shaft, a bell crank lever, one arm of which constitutes a toothed segment, a link connection between the other arm of said lever and said first mentioned arm, a complementary segment engaging the lever, means for operating the segment in the forward direction, a pawl and ratchet coupling between the first mentioned arm and the engine shaft, and means for releasing the pawl from the ratchet in the return movement of the parts.

12. The combination with a motor, of means for starting the same comprising an arm operatively associated with the motor shaft, a bell crank lever, one arm of which constitutes a toothed segment, a link connection between the other arm of said lever and said first mentioned arm, a complementary segment engaging the lever, means for operating the segment in both a forward and reverse direction, a pawl and ratchet coupling between the first mentioned arm and the engine shaft, and means for releasing the pawl from the ratchet in the return movement of the parts.

13. The combination with a motor, of means for starting the same comprising an arm operatively associated with the motor shaft, a bell crank lever, one arm of which constitutes a toothed segment, a link connection between the other arm of said lever, and said first mentioned arm, a complementary segment engaging the lever, means for operating the segment in the forward direction, a pawl and ratchet coupling between the first mentioned arm and the engine shaft, means for releasing the pawl from the ratchet, in the return movement of the parts, and means for positively holding the pawl in its disengaged position.

14. The combination with a motor, of means for starting the same comprising an arm operatively associated with the motor shaft, a bell crank lever, one arm of which constitutes a toothed segment, a link connection between the other arm of said lever and said first mentioned arm, a complementary segment engaging the lever, means for operating the segment in both a forward and reverse direction, a pawl and ratchet coupling between the first mentioned arm and the engine shaft, means for releasing the pawl from the ratchet in the return movement of the parts, and means for positively holding the pawl in its disengaged position.

15. A starting device for motors, including a pawl and ratchet, an arm carrying the pawl, means connected with said arm for operating the same including a movable part pivotally connected thereto, means on said movable part for positively engaging the pawl to disengage it from its ratchet, and a back spring limiting the disengaging movement of said pawl.

16. A starting device for motors, including a pawl and ratchet, an arm carrying the pawl, means connected with said arm for operating the same including a movable part pivotally connected thereto, means on said movable part for positively engaging the pawl to disengage it from its ratchet, a back spring limiting the disengaging movement of said pawl, and a frictional retarding device preventing too free movement of the pawl.

17. The combination with a motor, of means for starting the same including a pawl and ratchet coupling between the actuating parts and the motor shaft, means for automatically shifting the pawl, a back spring limiting the disengaging movement of the pawl, and a frictional retarding device preventing too free movement of the pawl.

18. A starting device for motors including a pawl and ratchet, an arm carrying the pawl, means connected with said arm for operating the same including a movable part pivotally connected thereto, and means on said movable part for throwing the pawl into engagement with the ratchet in the forward movement of the device and to disengage the pawl in the reverse movement of the device.

19. A starting device for motors including a pawl and ratchet, an arm carrying the pawl, means connected with said arm for operating the same including a movable part, and means on said movable part for throwing the pawl into engagement with the ratchet in the forward movement of the device and to disengage the pawl in the reverse movement of the device, comprising a spring and a projection on the pawl in the path of movement of the spring.

20. A starting device for motors including a pawl and ratchet, an arm carrying the pawl, and means connected with said arm for operating the same including a movable part pivoted to the arm, and means on said movable part for engaging the pawl, and positively holding the same out of engagement with the ratchet in the reverse movement of the device.

21. A starting device for motors including a pawl and ratchet, an arm carrying the pawl, means connected with said arm for operating the same including a movable part pivoted to the arm, and means on said movable part for engaging the pawl, and positively holding the same out of engagement with the ratchet in the reverse movement of the device, said means comprising a cam or projection arranged to ride against the tail of the pawl.

22. A starting device for motors including a pawl and ratchet, an arm carrying the pawl, means connected with said arm for operating the same including a movable part pivoted to the arm, means on said movable part for engaging the pawl, and positively holding the same out of engagement with the ratchet in the reverse movement of the device, and a spring also movable with said movable part adapted to engage the pawl to shift the same.

23. A starting device for motors including a pawl and ratchet, an arm carrying the pawl, means connected with said arm for operating the same including a movable part pivoted to the arm, means on said movable part for engaging the pawl, and positively holding the same out of engagement with the ratchet in the reverse movement of the device, said means comprising a cam or projection arranged to ride against the tail of the pawl, and a spring also movable with said movable part adapted to engage the pawl to shift the same.

24. A starting device for motors including a pawl and ratchet, an arm carrying the pawl, means connected with said arm for operating the same including a movable part pivoted to the arm, means on said movable part for engaging the pawl, and positively holding the same out of engagement with the ratchet in the reverse movement of the device, and a spring also movable with said movable part adapted to engage the pawl to shift the same both into and out of engagement with the ratchet.

25. A starting device for motors including a pawl and ratchet, an arm carrying the pawl, means connected with said arm for operating the same including a movable part pivoted to the arm, means on said movable part for engaging the pawl, and positively holding the same out of engagement with the ratchet in the reverse movement of the device, said means comprising a cam or projection arranged to ride against the tail of the pawl, and a spring also movable with said movable part adapted to engage the pawl to shift the same both into and out engagement with the ratchet.

26. A starting device for motors including a pawl and ratchet, an arm carrying the pawl, means connected with said arm for operating the same including a movable part pivoted to the arm, means on said movable part for engaging the pawl, and positively holding the same out of engagement with the ratchet in the reverse movement of the device, and a spring also movable with the said movable part adapted to engage the pawl to shift the pawl out of engagement with the ratchet in the reverse movement of the device and in advance of the engagement of the cam with the pawl.

27. A starting device for motors including a pawl and ratchet, an arm carrying the pawl, means connected with said arm for operating the same including a movable part pivoted to the arm, means on said movable part for engaging the pawl, and positively holding the same out of engagement with the ratchet in the reverse movement of the device, said means comprising a cam or projection arranged to ride against the tail of the pawl, and a spring also movable with said movable part adapted to engage the pawl to shift the pawl out of engagement with the ratchet in the reverse movement of the device and in advance of the engagement of the cam with the pawl.

28. The combination with a motor, of means for starting the same including a pawl and ratchet connection operatively associated with the engine shaft, an arm carrying said pawl, means for operating the arm including a part movably connected therewith, and a spring shiftable with said part operating in the forward movement of the device to engage the pawl with the ratchet and in the reverse movement of the device to disengage the pawl from the ratchet.

29. The combination with a motor, of means for starting the same including a pawl and ratchet connection operatively associated with the engine shaft, an arm carrying said pawl, means for operating the arm including a part movably connected therewith, a spring shiftable with said part operating in the forward movement of the device to engage the pawl with the ratchet and in the reverse movement of the device to disengage the pawl from the ratchet, and means for retarding the swinging movement of the pawl.

30. The combination with a motor, of means for starting the same including a pawl and ratchet connection operatively associated with the engine shaft, an arm carrying said pawl, means for operating the arm including a part movably connected therewith, a spring shiftable with said part operating in the forward movement of the device to engage the pawl with the ratchet and in the reverse movement of the device to disengage the pawl from the ratchet, and means for retarding the swinging movement of the pawl, said last mentioned means comprising an adjustable friction device engaging the pawl.

31. The combination with a motor, of means for starting the same comprising an arm operatively associated with the motor shaft, a bell crank lever, a link connection between one arm of said bell crank lever and said first mentioned arm, and means for shifting the other arm of said bell crank lever.

32. The combination with a motor, of means for starting the same comprising an arm operatively associated with the shaft of the motor, a bell crank lever one arm of which constitutes a segment, a link connection between the other arm of the bell crank lever and said first mentioned arm, and means for engaging said segment to shift said bell crank lever.

33. A starting device for motors comprising an arm operatively associated with the motor shaft, a lever, a link connecting said lever and arm, a pawl carried by the arm and adapted to engage said ratchet wheel when the lever is moved in one direction, said link being provided with a portion adapted to directly engage said pawl and disengage it from the ratchet when the lever is shifted in the opposite direction.

In testimony whereof we affix our signatures in presence of two witnesses.

ROLLIN F. WEBBER.
GEO. W. SLATER.

Witnesses:
GRACE A. MARVIN,
JAS. E. HUTCHINSON.

Copies of this patent may be obtained for five cents each, by addressing the "Commissioner of Patents, Washington, D. C."